United States Patent
Kubo

(10) Patent No.: US 6,370,643 B1
(45) Date of Patent: Apr. 9, 2002

(54) MICROCOMPUTER RESET DEVICE FOR POSITIVELY RESETTING MICROCOMPUTER BEFORE STARTING OPERATION

(75) Inventor: Kenji Kubo, Hyogo (JP)

(73) Assignees: Mitsubishi Electric System LSI Design Corporation, Itami; Mitsubishi Denki Kabushiki Kaisha, Tokyo, both of (JP)

(*) Notice: Subject to any disclaimer, the term of this patent is extended or adjusted under 35 U.S.C. 154(b) by 0 days.

(21) Appl. No.: 09/330,176

(22) Filed: Jun. 11, 1999

(30) Foreign Application Priority Data

Jan. 20, 1999 (JP) ............................................ 11-012353

(51) Int. Cl.[7] .............................................. G06F 9/445
(52) U.S. Cl. ............................. 713/1; 710/131; 363/20; 307/85
(58) Field of Search .......................... 713/1, 100, 600; 710/131; 363/20, 97, 131; 320/167; 307/85, 66, 64

(56) References Cited

U.S. PATENT DOCUMENTS

| | | | | |
|---|---|---|---|---|
| 3,836,854 A | * | 9/1974 | Wehman | ...................... 324/133 |
| 5,596,532 A | * | 1/1997 | Cernea et al. | ......... 365/185.18 |
| 5,608,343 A | * | 3/1997 | Ojima et al. | .................... 326/93 |
| 5,742,268 A | * | 4/1998 | Noda | ........................... 345/84 |
| 5,880,998 A | * | 3/1999 | Tanimura et al. | ....... 365/189.05 |
| 6,163,142 A | * | 12/2000 | Tsujimoto | .................... 323/283 |
| 6,195,271 B1 | * | 2/2001 | Suzuki et al. | .................. 363/20 |
| 6,259,171 B1 | * | 7/2001 | Cheng | .......................... 307/85 |

FOREIGN PATENT DOCUMENTS

JP    5-189090    7/1993

* cited by examiner

Primary Examiner—Thomas Lee
Assistant Examiner—Rijue Mai
(74) Attorney, Agent, or Firm—Burns, Doane, Swecker & Mathis, LLP

(57) ABSTRACT

A microcomputer reset device includes a switching circuit for comparing, after a reset of a CPU is released during power-up, a reference voltage Vref with a second divided voltage Vd2 which is proportional to a supply voltage and is adjusted by the CPU, and for switching, when the second divided voltage Vd2 exceeds the reference voltage Vref, a clock source of the CPU from an internal clock signal to an external clock signal. This makes it possible to solve a problem of a conventional microcomputer reset device in that it is not unlikely that the microcomputer starts its operation before its reset has been completed, which hinders the normal operation of the microcomputer.

4 Claims, 6 Drawing Sheets

SIGNAL VARIATIONS UNTIL RESET RELEASE

SIGNAL VARIATIONS AFTER RESET RELEASE

MICROCOMPUTER RESET DEVICE FOR POSITIVELY RESETTING MICROCOMPUTER BEFORE STARTING OPERATION

BACKGROUND OF THE INVENTION

1. Field of the Invention

The present invention relates to a microcomputer reset device for releasing the reset of a microcomputer when its power supply voltage exceeds its operation lower voltage limit during power-up.

2. Description of Related Art

FIG. 5 is a circuit diagram showing a conventional microcomputer reset device, in which the reference numeral 1 designates a power supply for outputting a supply voltage Vcc; 2 designates a resistor with its first end connected to the power supply 1; 3 designates a capacitor with its first end connected to a second end of the resistor 2, and its second end connected to a ground 4.

Next, the operation of the conventional reset device will be described.

First, to release the reset of the microcomputer, it is necessary to set an appropriate lower voltage limit of the supply voltage to the microcomputer in accordance with the operation frequency of the microcomputer. However, applications of microcomputers are versatile, and their operation frequencies are diversified. Generally, the operation lower voltage limit of the microcomputer increases with the operation frequency.

The conventional microcomputer reset device outputs as a reset signal a divided voltage Vd obtained by dividing the supply voltage Vcc with the resistor 2 and the capacitor 3. The divided voltage Vd rises as shown in FIG. 6 during power-up, producing a reset signal as long as it is lower than a threshold voltage Vset which is set at half the supply voltage Vcc, for example.

Accordingly, the reset of the microcomputer is carried out from time T0 to time T1 in which the divided voltage Vd is less than the threshold voltage Vset. Since the divided voltage Vd exceeds the threshold voltage Vset at time T1, the reset of the microcomputer is released, and the microcomputer starts its normal operation.

However, when the rise of the supply voltage Vcc is slow, the rise of the threshold voltage Vset is also delayed as illustrated in FIG. 7. In this case, it sometimes occurs that the divided voltage Vd exceeds the threshold voltage Vset from the very beginning of the power-up (always Vd >Vset) so that the microcomputer cannot be reset normally.

Taking account of this, there is a reset device as shown in FIG. 8 which can reset a microcomputer normally even if the rise of the supply voltage is slow. In this reset device, a comparator 7 compares a divided voltage Vd with a reference voltage Vref output from a constant voltage generator 6, enables the reset signal RESET for resetting the microcomputer as long as the divided voltage Vd is lower than the reference voltage Vref, and disables the reset signal RESET to release the reset of the microcomputer when the divided voltage Vd exceeds the reference voltage Vref.

In some cases, however, such a reset device can cause a problem in that the microcomputer starts its operation at the supply voltage Vcc at which it cannot operate normally. This is because without adjusting the divided voltage Vd for each application circuit of the microcomputer by suitably controlling the values of the resistors 2 and 5, the divided voltage Vd can exceed the reference voltage Vref before the supply voltage Vcc exceeds the operation lower voltage limit, and hence the reset of the microcomputer is released.

Thus, it is not unlikely for the conventional reset devices with the foregoing configurations to start the operation of the microcomputer before the reset is completed if the rise of the power supply is not quick enough. This presents a problem of being unable to ensure the stable normal operation of the microcomputer.

Although the reset device with the comparator 7 as shown in FIG. 8 can start the operation of the microcomputer after it positively resets the microcomputer even in the case of a slow rising power supply, it has another problem of increasing the manufacturing cost because of design changes required for each application circuit of the microcomputer such as altering the values of the resistors 2 and 5.

SUMMARY OF THE INVENTION

The present invention is implemented to solve the foregoing problem. It is therefore an object of the present invention to provide a microcomputer reset device, which can start the operation of the microcomputer after positively completing its reset without requiring any design changes for individual application circuits of the microcomputer.

According to a first aspect of the present invention, there is provided a microcomputer reset device comprising: an initializing circuit for placing a microcomputer in a reset state as long as a first divided voltage proportional to a supply voltage is lower than a reference voltage, and for releasing the reset state of the microcomputer when the first divided voltage exceeds the reference voltage; an adjusting circuit for adjusting, in response to an operation frequency of the microcomputer, a second divided voltage which is proportional to the supply voltage; and a switching circuit for comparing the second divided voltage adjusted by the adjusting circuit with the reference voltage, and for switching, when the second divided voltage exceeds the reference voltage, a clock source of the CPU from an internal clock signal to an external clock signal.

Here, the microcomputer reset device may further comprise a reset circuit for resetting, after the switching circuit switches the clock source of the microcomputer from the internal clock signal to the external clock signal, the microcomputer if the second divided voltage adjusted by the adjusting circuit drops below the reference voltage with canceling a reset operation of the initializing circuit.

The reset circuit may release the reset of the microcomputer when the second divided voltage exceeds the reference voltage.

According to a second aspect of the present invention, there is provided a microcomputer reset device comprising: an initializing circuit for placing a microcomputer in a reset state as long as a first divided voltage proportional to a supply voltage is lower than a reference voltage, and for releasing the reset state of the microcomputer when the first divided voltage exceeds the reference voltage; an adjusting circuit for adjusting, in response to an operation frequency of the microcomputer, a second divided voltage which is proportional to the supply voltage; a counter for counting an interval from a time when the initializing circuit releases the reset of the microcomputer to a time when the second divided voltage adjusted by the adjusting circuit exceeds the reference voltage; and a switching circuit for calculating a clock switching time from the interval counted by the counter, and for switching, when the clock switching time comes, a clock source of the CPU from an internal clock signal to an external clock signal.

DETAILED DESCRIPTION OF THE PREFERRED EMBODIMENTS

The invention will now be described with reference to the accompanying drawings.

EMBODIMENT 1

Figure 1:
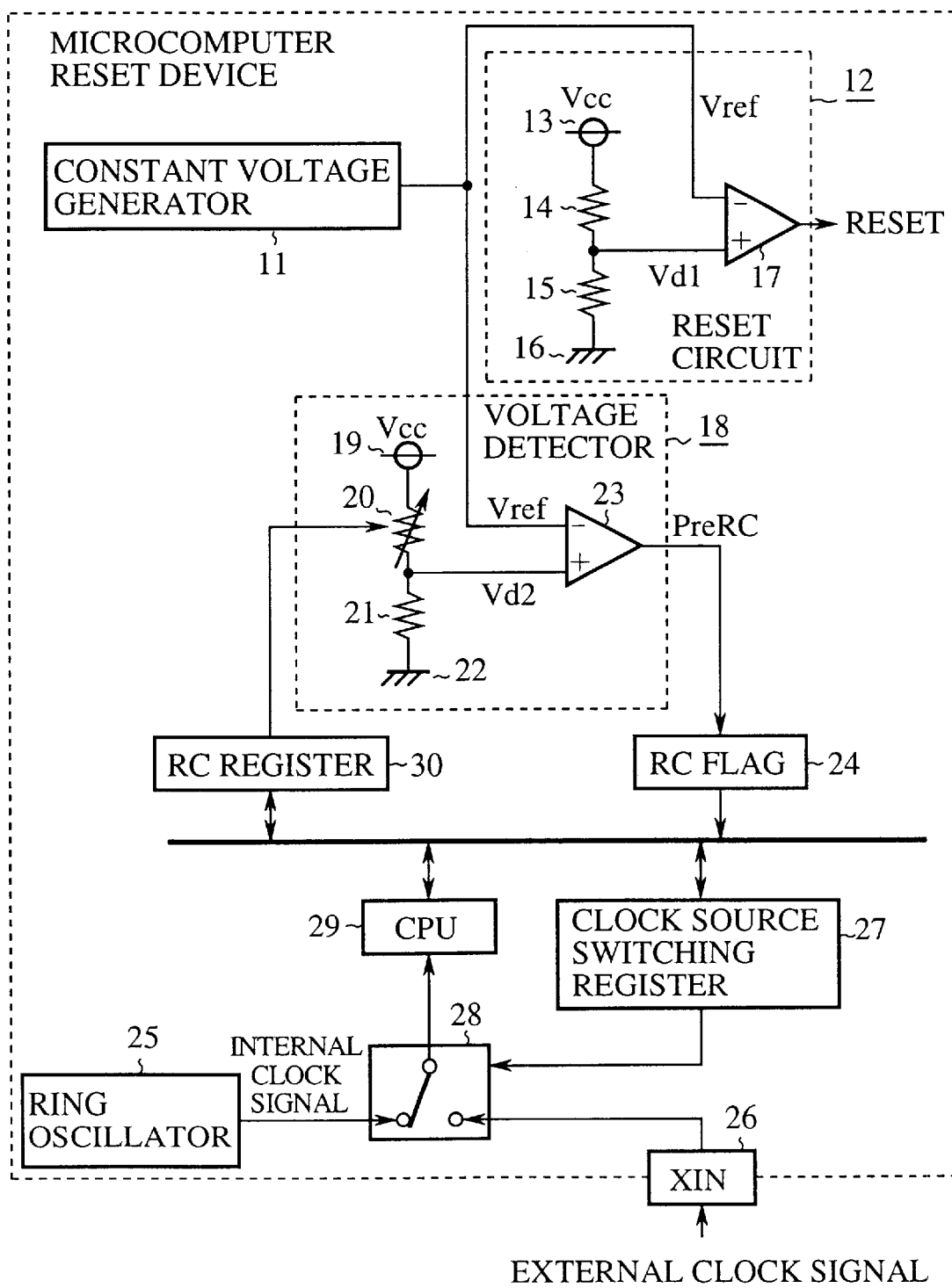
FIG. 1 is a block diagram showing an embodiment 1 of a microcomputer reset device in accordance with the present invention.

FIG. 1 is a block diagram showing an embodiment 1 of a microcomputer reset device in accordance with the present invention. In FIG. 1, the reference numeral 11 designates a constant voltage generator for generating a reference voltage Vref; 12 designates a reset circuit that resets a CPU 29 by enabling a reset signal RESET as long as a divided voltage Vd1 proportional to a supply voltage Vcc is lower than the reference voltage Vref, and releases the CPU 29 by disabling the reset signal RESET when the divided voltage Vd1 exceeds the reference voltage Vref; 13 designates a power supply for outputting the supply voltage Vcc; 14 designates a resistor with its first end connected to the power supply 13; 15 designates a resistor with its first end connected to a second end of the resistor 14 and its second end connected to a ground 16; 17 designates a comparator that compares the divided voltage Vd1 with the reference voltage Vref output from the constant voltage generator 11, and enables the reset signal RESET as long as the divided voltage Vd is lower than the reference voltage Vref.

The reference numeral 18 designates a voltage detector that compares a divided voltage Vd2 proportional to the supply voltage Vcc with the reference voltage Vref output from the constant voltage generator 11, and outputs a compared result PreRC; 19 designates a power supply for outputting the supply voltage Vcc; 20 designates a variable resistor whose resistance is adjusted in accordance with a value stored in an RC register 30; 21 is a resistor connected in series with the variable resistor 20; 22 designates a ground; 23 designates a comparator that compares the divided voltage Vd2 with the reference voltage Vref output from the constant voltage generator 11, and outputs a compared result PreRC; and 24 designates an RC flag for storing the compared result PreRC output from the voltage detector 18.

The reference numeral 25 designate a ring oscillator for oscillating an internal clock signal; 26 designates an external clock input terminal for inputting an external clock signal with an operation frequency required by an application circuit of the microcomputer; 27 designates a clock source switching register for storing select information for controlling the position of a selector 28 that outputs either the internal clock signal or the external clock signal in response to the value stored in the clock source switching register 27; 29 designates the CPU that adjusts the value stored in the RC register 30 in order to generate the divided voltage Vd2 corresponding to the operation frequency of the microcomputer, and switches the clock source from the internal clock signal to the external clock signal when the compared result PreRC stored in the RC flag 24 indicates that the divided voltage Vd2 is higher than the reference voltage Vref; and 30 designates the RC register for storing data corresponding to the resistance of the variable resistor 20.

Next, the operation of the present embodiment 1 will be described.

First, during power-up, the selector 28 supplies the CPU 29 with the internal clock signal output from the ring oscillator 25. Accordingly, the CPU 29 must be released from its reset state after the supply voltage Vcc exceeds the lower voltage limit Vti (see, FIG. 2A) at which the CPU can achieve normal operation based on the internal clock signal.

Figure 2A:
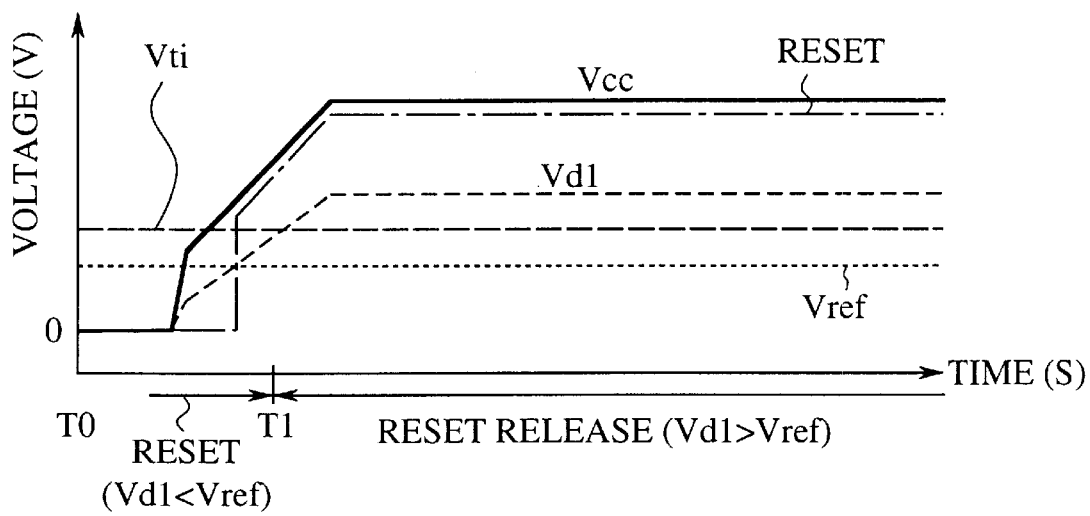
FIG. 2A is a time chart illustrating changes of various signals of the embodiment 1 up to a reset release.

Thus, during the power-up, the reset circuit 12 compares the divided voltage Vd1 proportional to the supply voltage Vcc with the reference voltage Vref output from the constant voltage generator 11 as illustrated in FIG. 2A, so that the reset circuit 12 enables the reset signal RESET to reset the CPU 29 while the divided voltage Vd1 is lower than the reference voltage Vref, and then disables the reset signal RESET to release the reset of the CPU 29 when the divided voltage Vd1 exceeds the reference voltage Vref at time T1.

Figure 8:
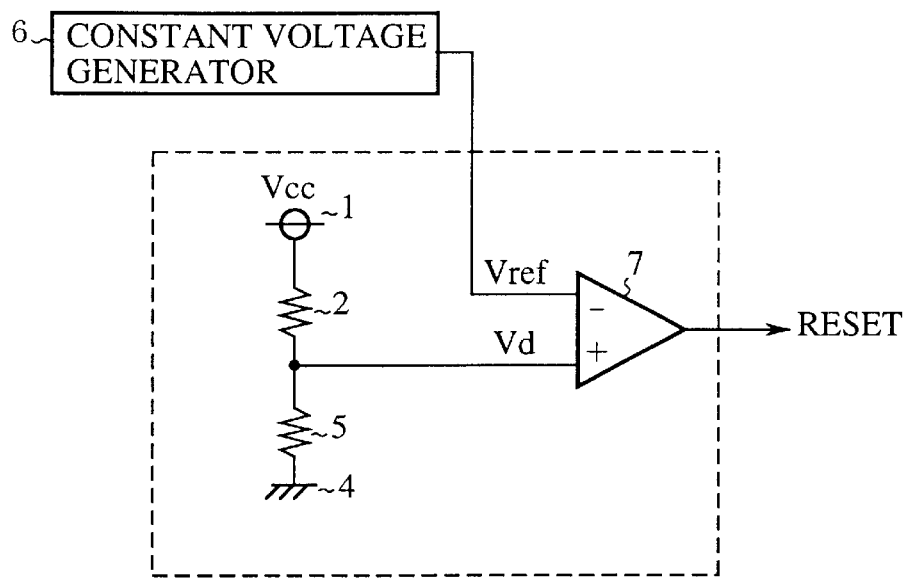
FIG. 8 is a block diagram showing another conventional microcomputer reset device.
Figure 9:
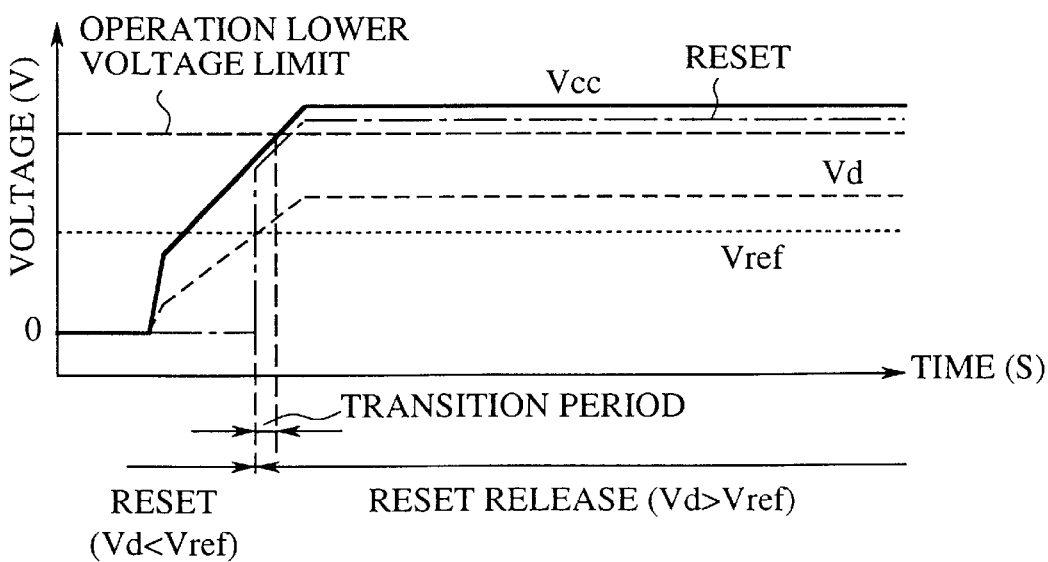
FIG. 9 is a time chart illustrating changes of various signals of the conventional reset device as shown in FIG. 8.

The internal clock signal, which is supplied continually to the CPU 29 during the power-up, makes it unnecessary, even when an application circuit of the microcomputer is changed, to adjust the values of the resistors 14 and 15 in the reset circuit 12 as in the conventional reset device as shown in FIG. 8.

Once having been released from the reset in this way, the CPU 29 controls the value stored in the RC register 30 to adjust the resistance of the variable resistor 20 in the voltage detector 18, thereby making preparations for switching the clock source from the internal clock signal to the external clock signal.

More specifically, the CPU 29 adjusts the resistance of the variable resistor 20 in order to set the divided voltage Vd2 to be compared with the reference voltage Vref so that the switching to the external clock signal is carried out only after the supply voltage Vcc positively exceeds the lower voltage limit at which the CPU 29 can achieve its operation based on the external clock signal. Although a method for determining the divided voltage Vd2 is not specified, it is usually decided when the frequency of the external clock signal and the supply voltage Vcc are determined. After the CPU 29 adjusts the resistance of the variable resistor 20 by controlling the value stored in the RC register 30, the voltage detector 18 compares the divided voltage Vd2 with the reference voltage Vref output from the constant voltage generator 11, and stores the compared result PreRC in the RC flag 24.

Figure 2B:
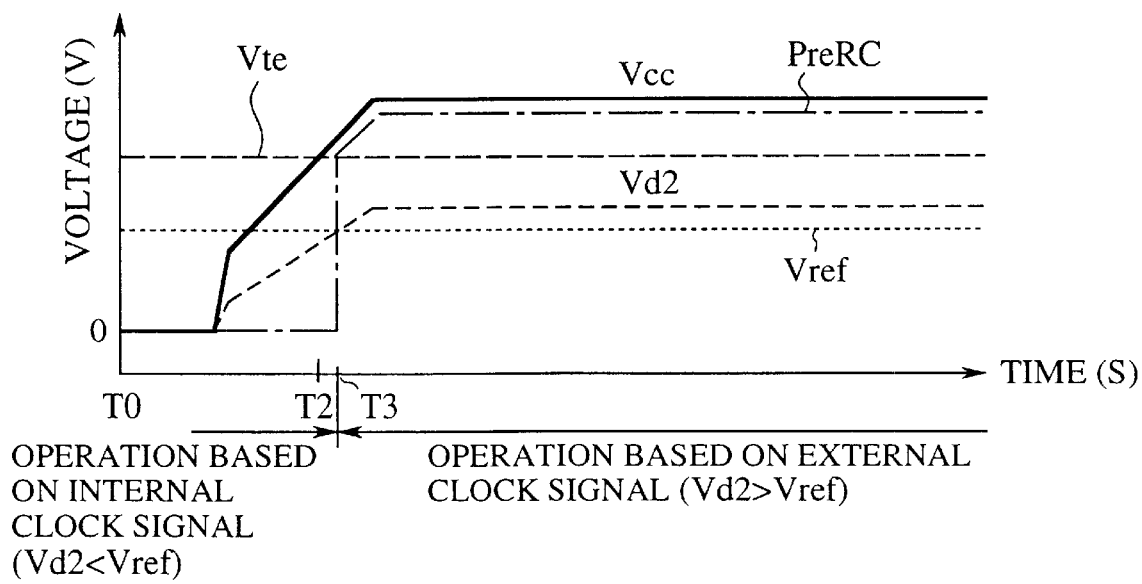
FIG. 2B is a time chart illustrating changes of various signals of the embodiment 1 after the reset released.

Referring the compared result PreRC stored in the RC flag 24, the CPU 29 continues the state, in which it is supplied with the internal clock signal, as long as the divided voltage Vd2 is lower than the reference voltage Vref. However, when the divided voltage Vd2 exceeds the reference voltage Vref at time T3 as illustrated in FIG. 2B, the CPU 29 stores in the clock source switching register 27 the select information instructing the selector 28 to change its position to the position for inputting the external clock signal. This is because the supply voltage Vcc has already exceeded (at time T2 before the time T3) the lower voltage limit Vte at which the CPU 29 can achieve its operation based on the external clock signal.

The clock source of the CPU 29 is thus switched from the internal clock signal to the external clock signal so that the CPU 29 can executes its operation based on the external clock signal from that time on.

As described above, the present embodiment 1 is configured such that it compares, after the reset of the CPU 29 is released, the divided voltage Vd2 adjusted by the CPU 29 with the reference voltage Vref, and switches the clock source from the internal clock signal to the external clock signal after the divided voltage Vd2 exceeds the reference voltage Vref. This offers an advantage of being able to start the operation of the CPU 29 after positively resetting it without changing the design for individual application circuits of the microcomputer.

EMBODIMENT 2

Figure 3:
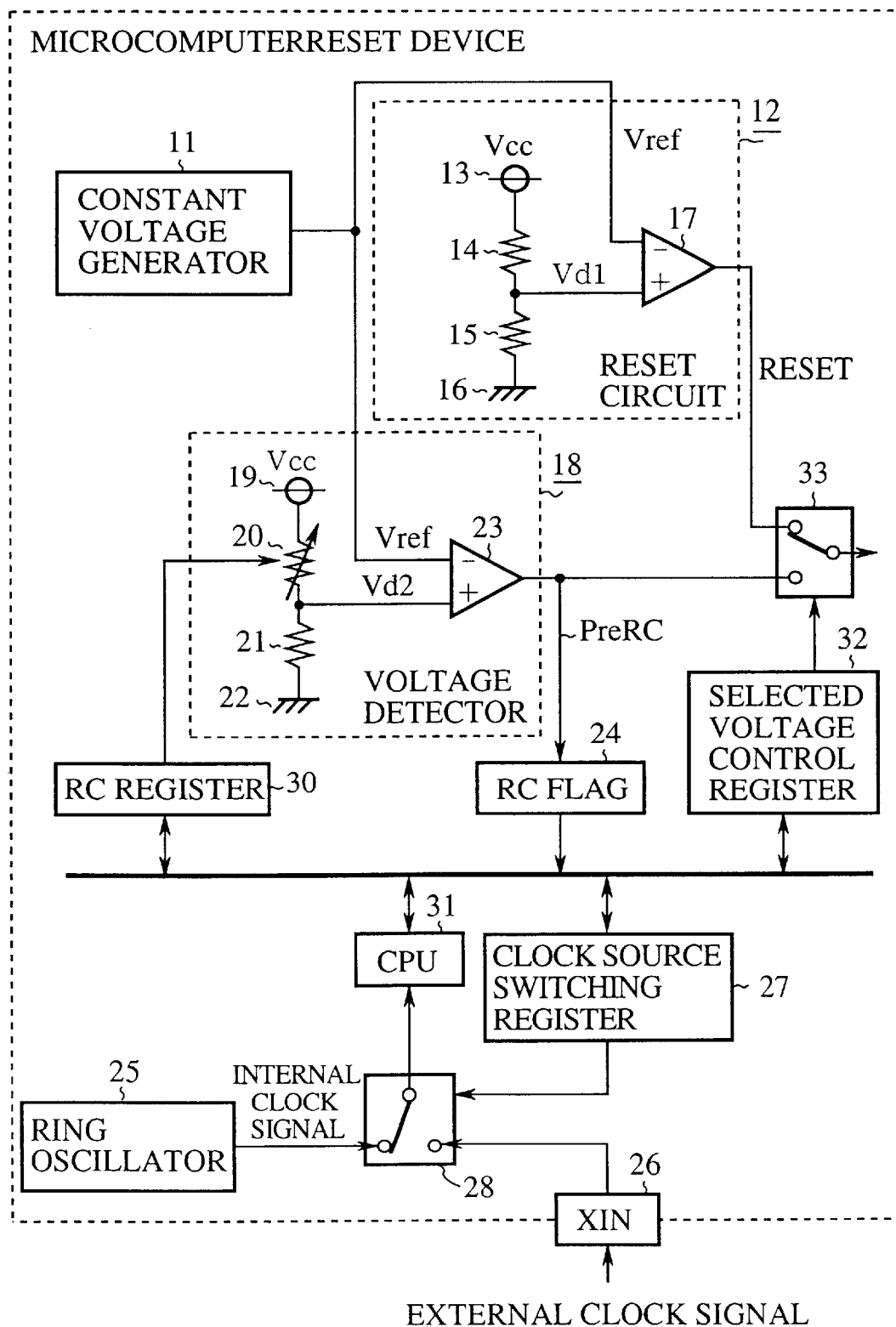
FIG. 3 is a block diagram showing an embodiment 2 of the microcomputer reset device in accordance with the present invention.

FIG. 3 is a block diagram showing an embodiment 2 of the microcomputer reset device in accordance with the present invention, in which the same reference numerals designate the same or like portions to those of FIG. 1, and hence the description thereof is omitted here.

In FIG. 3, the reference numeral 31 designates a CPU that carries out, besides the functions of the CPU 29, switching of the input of a selector 33 from the reset circuit 12 to the voltage detector 18 when the clock source is switched from the internal clock signal to the external clock signal; 32 designates a selected voltage control register for storing select information for controlling the position of the selector 33; and 33 designates the selector for outputting, in response to the value stored in the selected voltage control register 32, either the reset signal RESET output from the reset circuit 12 or the compared result PreRC output from the voltage detector 18.

Next, the operation of the present embodiment 2 will be described.

Although in the foregoing embodiment 1, the CPU is placed in the reset state by enabling the reset signal RESET as long as the divided voltage Vd1 is lower than reference voltage Vref during the power-up, once the reset of the CPU 31 has been released, and the clock source has been switched from the internal clock signal to the external clock signal, the compared result PreRC output from the voltage detector 18 can be used as the reset signal with canceling the reset operation of the reset circuit 12.

Specifically, once the clock source has been switched from the internal clock signal to the external clock signal, the CPU 31 starts its operation based on the external clock signal. Accordingly, its normal operation is ensured as long as the supply voltage Vcc exceeds the lower voltage limit which enables the CPU 31 to operate based on the external clock signal.

Thus, if the supply voltage Vcc drops, due to some reason, below the lower voltage limit that enables the operation based on the external clock signal, the CPU 31 is reset to prevent its run away. To achieve this, the CPU 31 controls the value stored in the selected voltage control register 32 to switch the input of the selector 33 from the reset circuit 12 to the voltage detector 18.

As a result, the selector 33 outputs the compared result PreRC by the voltage detector 18, which functions as the reset signal as long as the divided voltage Vd2 is lower than the reference voltage Vref, and carries out the reset of the CPU 31.

Subsequently, when the compared result PreRC indicates that the divided voltage Vd2 exceeds the reference voltage Vref, the CPU 31 is released from its reset state, and starts its normal operation.

As described above, the present embodiment 2 is configured such that once the clock source of the CPU 31 has been changed from the internal clock signal to the external clock signal, it cancels the reset operation of the reset circuit 12, and resets the CPU 31 if the divided voltage Vd2 drops below the reference voltage Vref. This offers an advantage of being able to prevent the CPU 31 from running away even in a case where the supply voltage Vcc drops below the lower voltage limit during the operation based on the external clock signal. In addition, the operation lower voltage limit that enables the operation based on the external clock signal can be adjusted by a program in accordance with the frequency of the CPU 31.

EMBODIMENT 3

Figure 4:
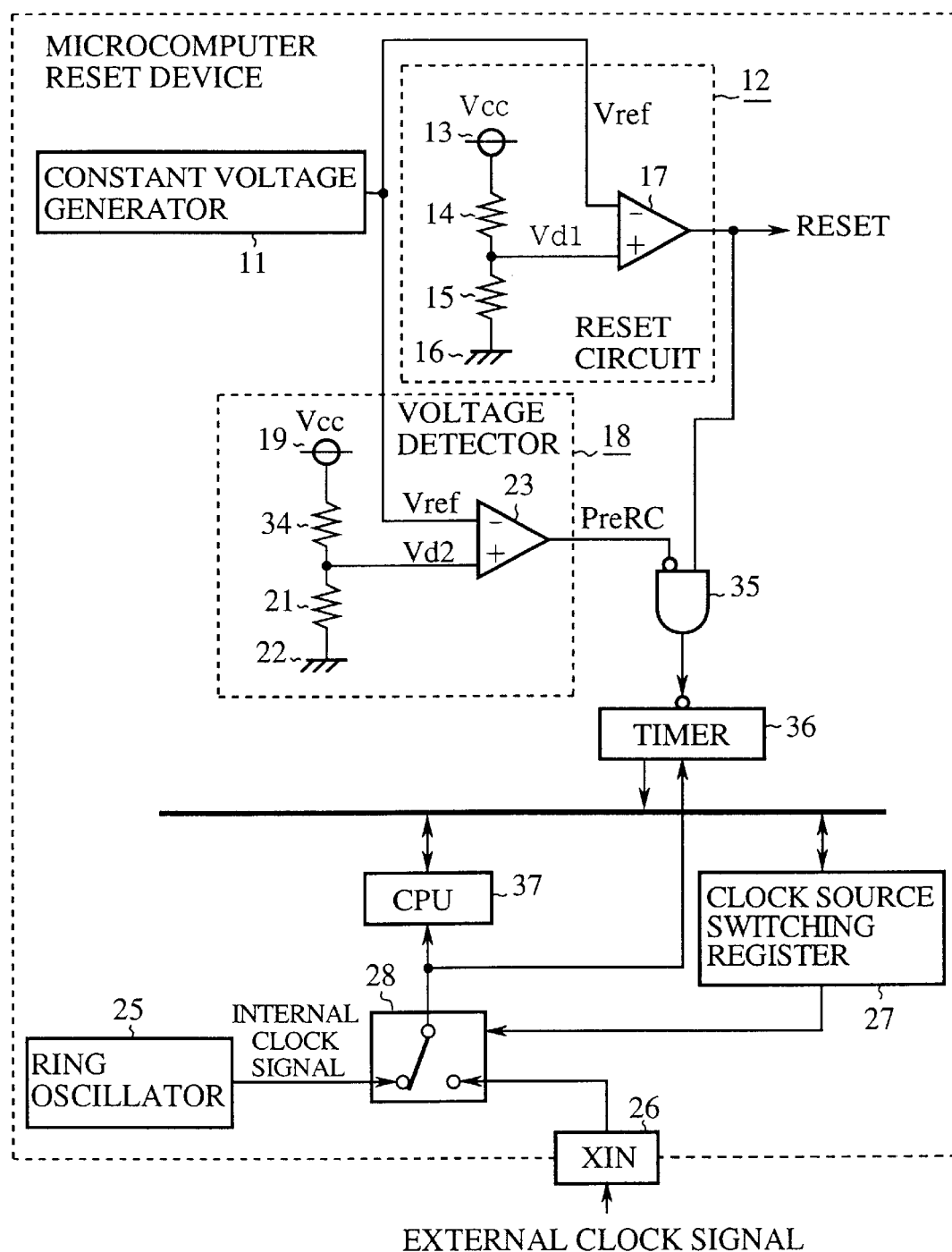
FIG. 4 is a block diagram showing an embodiment 3 of the microcomputer reset device in accordance with the present invention.
Figure 5:
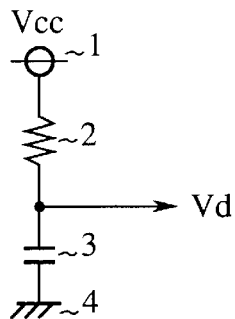
FIG. 5 is a circuit diagram showing a conventional microcomputer reset device.
Figure 6:
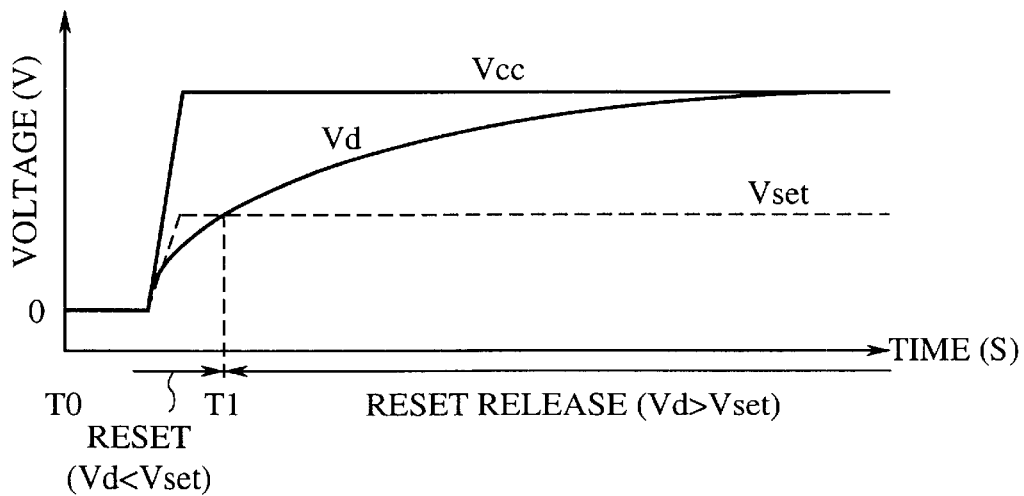
FIG. 6 is a time chart illustrating changes of various signals of the conventional reset device as shown in FIG. 5.
Figure 7:
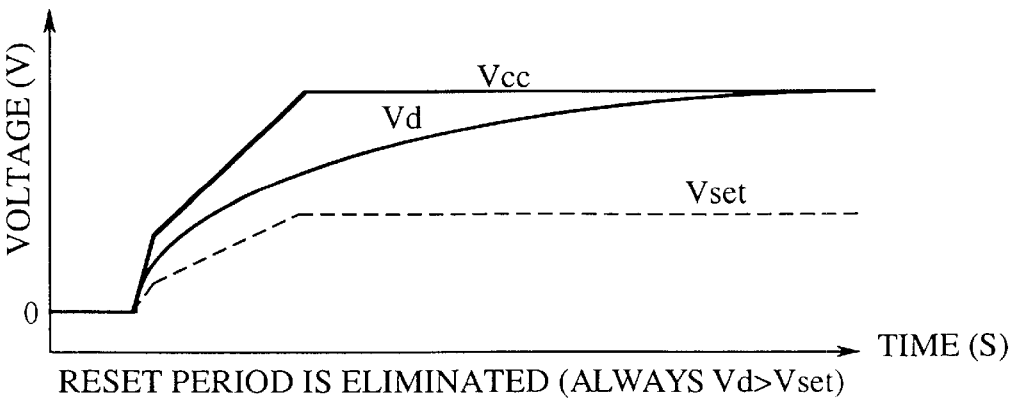
FIG. 7 is another time chart illustrating changes of various signals of the conventional reset device as shown in FIG. 5.

FIG. 4 is a block diagram showing an embodiment 3 of the microcomputer reset device in accordance with the present invention. In FIG. 4, the same reference numerals designate the same or like portions to those of FIG. 1, and the description thereof is omitted here.

The reference numeral 34 designates a resistor whose resistance is determined such that the divided voltage Vd2 of the voltage detector 18 becomes lower than the divided voltage Vd1 of the reset circuit 12; 35 designates a logic circuit for activating a timer 36 as long as the reset circuit 12 outputs a high-level reset signal RESET (in which the reset of a CPU 37 is released) and the voltage detector 18 outputs a low-level compared result PreRC (during which the divided voltage Vd2 is lower than the reference voltage Vref); 36 designates the timer for counting an interval t from a time when the reset circuit 12 releases the reset of the microcomputer to a time when the second divided voltage Vd2 exceeds the reference voltage Vref; and 37 designates the CPU that calculates a clock switching time αt by multiplying the interval t counted by the counter 36 by a coefficient a for adjusting a waiting time for switching the clock source, and is switches the clock source from the internal clock signal to the external clock signal by controlling the value stored in the clock source switching register 27 when the clock switching time a t has elapsed from the time the second divided voltage Vd2 exceeds the reference voltage Vref.

Next, the operation of present embodiment 3 will be described.

Although the foregoing embodiment 1 switches the clock source from the internal clock signal to the external clock signal when the voltage detector 18 outputs the compared result PreRC indicating that the divided voltage Vd2 exceeds the reference voltage Vref, it is not essential. For example, the clock source can be switched as follows.

After having been released from its reset state by the reset circuit 12, the CPU 37 enables the timer 36 throughout the time during which the divided voltage Vd2 is lower than the reference voltage Vref to measure the interval t.

Obtaining the interval t, the CPU 37 multiples it by the coefficient a for adjusting a waiting time for switching the clock source from the internal clock signal to the external clock signal, thereby calculating the clock switching time α t.

Subsequently, when the clock switching time αt has elapsed from the time the second divided voltage Vd2 exceeds the reference voltage Vref, the CPU 37 switches the clock source from the internal clock signal to the external clock signal by controlling the value stored in the clock source switching register 27. This offers an advantage similar to that of the foregoing embodiment 1 due to the switching of the clock source from the internal clock signal to the external clock signal.

What is claimed is:

1. A microcomputer reset device comprising:

an initializing circuit for placing a microcomputer in a reset state as long as a first divided voltage proportional to a supply voltage is lower than a reference voltage, and for releasing the reset state of the microcomputer when the first divided voltage exceeds the reference voltage;

an adjusting circuit for adjusting, in response to an operation frequency of the microcomputer, a second divided voltage which is proportional to the supply voltage; and a switching circuit for comparing the second divided voltage adjusted by said adjusting circuit with the reference voltage, and for switching, when the second divided voltage exceeds the reference voltage, a clock source of the CPU from an internal clock signal to an external clock signal.

2. The microcomputer reset device as claimed in claim 1, further comprising a reset circuit for resetting, after said switching circuit switches the clock source of the microcomputer from the internal clock signal to the external clock signal, said microcomputer if the second divided voltage adjusted by said adjusting circuit drops below the reference voltage with canceling a reset operation of the initializing circuit.

3. The microcomputer reset device as claimed in claim 2, wherein said reset circuit releases the reset of the microcomputer when the second divided voltage exceeds the reference voltage.

4. A microcomputer reset device comprising:

an initializing circuit for placing a microcomputer in a reset state as long as a first divided voltage proportional to a supply voltage is lower than a reference voltage, and for releasing the reset state of the microcomputer when the first divided voltage exceeds the reference voltage;

an adjusting circuit for adjusting, in response to an operation frequency of the microcomputer, a second divided voltage which is proportional to the supply voltage;

a counter for counting an interval from a time when said initializing circuit releases the reset of said microcomputer to a time when the second divided voltage adjusted by said adjusting circuit exceeds the reference voltage; and a switching circuit for calculating a clock switching time from the interval counted by said counter, and for switching, when the clock switching time comes, a clock source of the CPU from an internal clock signal to an external clock signal.

* * * * *